US00RE38562E1

(19) United States
(12) Reissued Patent
Babiel et al.

(10) Patent Number: US RE38,562 E
(45) Date of Reissued Patent: Aug. 10, 2004

(54) PRESS HAVING A DOSING SYSTEM

(75) Inventors: Hartmut Babiel, Rottweil-Göllsdorf (DE); Thomas Elsässer, St. Georgen (DE); Erich Weisser, St. Georgen (DE)

(73) Assignee: Gebr. Schmidt Fabrik für Feinmechanik, St. Georgen (DE)

(21) Appl. No.: 10/453,293

(22) Filed: Jun. 3, 2003

Related U.S. Patent Documents

Reissue of:
(64) Patent No.: 6,189,444
Issued: Feb. 20, 2001
Appl. No.: 09/373,287
Filed: Aug. 12, 1999

(63) Continuation of application No. PCT/EP98/00041, filed on Jan. 7, 1998.

(30) Foreign Application Priority Data

Feb. 13, 1997 (DE) ..... 197 05 461

(51) Int. Cl.[7] ..... B30B 1/18

(52) U.S. Cl. ..... 100/289; 72/454; 83/631; 184/6.14

(58) Field of Search ..... 100/289, 299; 72/454; 83/631; 74/89.15, 424.8 R; 184/6.14, 14

(56) References Cited

U.S. PATENT DOCUMENTS

| | | | | |
|---|---|---|---|---|
| 1,273,265 A | | 7/1918 | Morgan | |
| 2,557,822 A | * | 6/1951 | Hoelscher | 184/6.14 |
| 3,064,758 A | | 11/1962 | Ohrnberger | |
| 3,331,469 A | | 7/1967 | Deflandre | |
| 3,827,354 A | | 8/1974 | Bredebusch | |
| 4,523,521 A | | 6/1985 | Huydts | |
| 5,123,342 A | | 6/1992 | Camossi | |

FOREIGN PATENT DOCUMENTS

| | | | | |
|---|---|---|---|---|
| DE | 1051581 | * | 2/1959 | |
| DE | 31 21 588 A1 | | 12/1982 | |
| DE | 39 28 652 C2 | | 4/1992 | |
| DE | 41 09 685 A1 | | 9/1992 | |
| DE | 42 34 905 A1 | | 8/1993 | |
| DE | 195 07 055 A1 | | 9/1996 | |
| EP | 0551028 | * | 7/1993 | F16N/15/00 |
| FR | 1390421 | * | 2/1965 | |

OTHER PUBLICATIONS

"Die Arbeitsweise der DKW–Frischöl–Automatik", Kraft-hand, vol. 22, Oct. 1961.

* cited by examiner

*Primary Examiner*—Stephen F. Gerrity
(74) *Attorney, Agent, or Firm*—Harness, Dickey & Pierce, P.L.C.

(57) ABSTRACT

A press has a press ram actuated by a drive apparatus and a dosing system to be actuated by the drive apparatus for lubricating at least the drive apparatus.

12 Claims, 1 Drawing Sheet

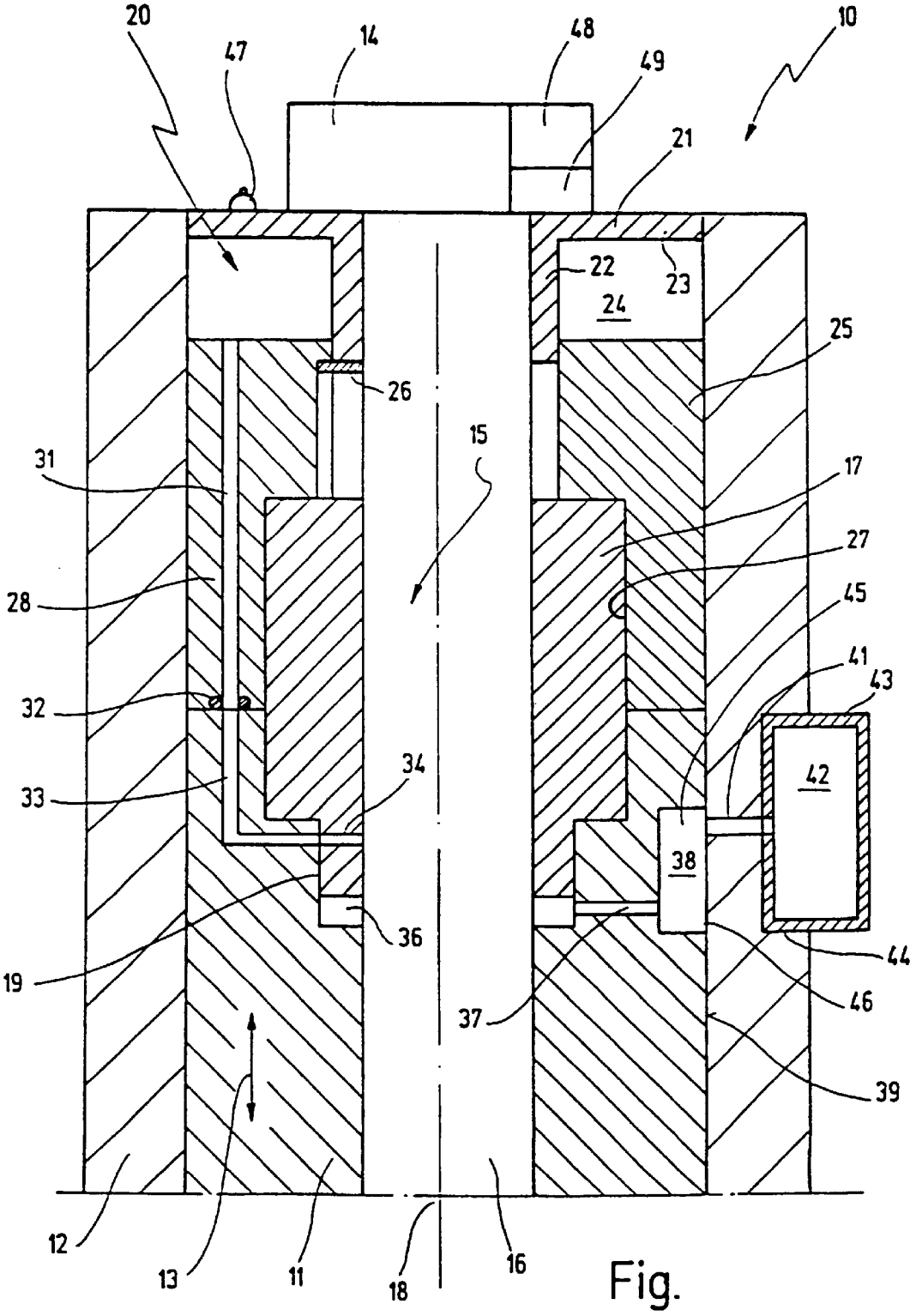
Fig.

PRESS HAVING A DOSING SYSTEM

Matter enclosed in heavy brackets [ ] appears in the original patent but forms no part of this reissue specification; matter printed in italics indicates the additions made by reissue.

[This is a continuation of International patent application No. PCT/EP98/00041, filed Jan. 7, 1998] *This application is a Re-Issue of U.S. Pat. No. 6,189,444, which is a continuation of International patent application No. PCT/EP98/00041, filed Jan. 7, 1998, which claims priority of German application Serial No. 197 05 461.7, filed Feb. 13, 1997.*

BACKGROUND OF THE INVENTION

1. Field of the Invention

The present invention relates to a device having a part actuated via a drive apparatus, preferably a handling device having an actuated positioning part or a press having a press ram actuated by the drive apparatus.

2. Related Prior Art

Devices of this kind are commonly known from the prior art; they serve as presses, for example on the one hand for shaping objects and on the other hand for fitting together workpieces that must be assembled under pressure. The handling devices used in particular in the press sector are used, for example, to position under the press the workpieces that are to be fitted together.

On the one hand fluid-actuated piston-cylinder units, and on the other hand spindle drives that are actuated via an electric motor, are known as the drive apparatus for devices of this kind.

Especially in the case of presses that must perform a very high number of press strokes during their service life, it is inherently necessary to lubricate the moving parts. In the case of spindle drives, for example, it is known that if they are not continuously lubricated during operation, they fail due to insufficient lubrication after approximately 500,000 strokes.

In spindle drives of this kind which have either a driven, axially nondisplaceable threaded spindle or a driven, axially nondisplaceable spindle nut, lubrication of the threads between the threaded spindle and spindle nut is, however, of very complex configuration, especially in presses, since this region in the interior of the press is poorly accessible. For this reason, it is impossible to use such spindle drives in so-called electric presses if such electric presses are to be operated in continuous service.

SUMMARY OF THE INVENTION

In view of the above, it is an object of the present invention to improve the device mentioned at the outset in such a way that with a simple design, continuous operation is possible and susceptibility to malfunction is reduced.

In the case of the device mentioned at the outset, this object is achieved according to the present invention in that a dosing system that can be actuated by the drive apparatus is provided for lubricating at least the drive apparatus.

The object underlying the invention is completely achieved in this fashion.

Specifically, the inventors of the present application have recognized that it is possible to equip, for example, a press of this kind with an automatic dosing system that can be actuated by the drive apparatus itself. This feature is advantageous in terms of design especially because lubrication is not achieved by way of an additional drive system or an additional pneumatic/hydraulic system, which would increase the design outlay, cost, and especially the susceptibility to malfunction. Both cost and susceptibility to malfunction would be increased even further with a separate drive system because of the additional monitoring elements for a separate drive system for this dosing system, and the additional control outlay.

Although the additional dosing system requires in all cases a greater design outlay than is necessary, for example, for presses without a dosing system, it is nevertheless possible in this case, because the usual drive apparatus that is already provided for the press ram can also be used to actuate the dosing system, to use the control system provided in any case for this so-called servo axis to control the lubrication or greasing system as well, so that no additional design actions are necessary for actuation and control of the dosing system.

It is preferred in general if the drive apparatus comprises a spindle drive as well as an electric motor for actuating the spindle drive, the spindle drive preferably comprising a threaded spindle, driven by the electric motor, that is mounted in axially nondisplaceable fashion, as well as a spindle nut that is axially displaceable via the threaded spindle but is radially nonrotatable, and is joined to the actuated part.

This feature is advantageous in terms of design: for example, presses with a stationary threaded spindle are generally of simpler design than presses having an axially nondisplaceable spindle nut.

It is furthermore preferred if the dosing system comprises a lubricant cylinder that can be filled with lubricant, as well as a greasing piston, for ejecting the lubricant, that projects into said cylinder's interior and can be actuated via the drive apparatus.

The advantage here is that the dosing system selected is extremely simple: the greasing piston must simply be pushed by the drive apparatus into the lubricant cylinder, a portion of the lubricant being delivered to the corresponding lubrication points with each inward push. Actuation of the greasing piston can be accomplished, for example, by the fact that the drive apparatus is selectably joined via a coupling to an advance linkage for the greasing piston. The greasing piston can then effect lubrication during a normal working stroke, provided it is coupled to the drive apparatus.

On the other hand, it is preferred if the greasing piston is in working engagement with the spindle drive as a function of the axial position of the actuated part.

The advantage here is that coupling is accomplished, so to speak, via the axial shifting of, for example, the press ram, so that no additional coupling elements, etc. are required.

It is further preferred if the greasing piston comes into contact with the spindle nut when the actuated part is in an axial position outside its working stroke.

The advantage here is that by way of a simple displacement of the spindle nut—and thus of, for example, the press ram—out of the actual region of the working stroke, the spindle nut comes into contact with the greasing piston and can then push the latter, controlled by the drive apparatus, progressively into the lubricant cylinder. This means that with the exception of a greasing piston, which can be actuated, for example, via a wedge drive train via the spindle nut, no major design changes need to be made to, for example, the press.

On the other hand, it is preferred if the lubricant cylinder is provided preferably concentrically with the threaded spindle, preferably on the side of the spindle nut remote from the press ram, and the greasing piston is arranged preferably concentrically with the threaded spindle between the lubricant cylinder and the spindle nut.

This feature is also advantageous in terms of design, since no further linkage is necessary between the greasing piston and the spindle nut. To perform a lubricating operation, the spindle nut simply needs to be moved upward, by corresponding rotation of the threaded spindle, until it comes indirectly or directly into contact with the greasing piston, and correspondingly pushes the latter farther into the lubricant cylinder.

If the lubricant cylinder and the greasing piston are arranged concentrically with the threaded spindle, they can be arranged above the spindle nut, for example in the tube which guides the press ram, so that there is also no great need for installation space for the dosing system.

It is preferred in this context if there is provided in the greasing piston a lubricant conduit that connects the interior space of the lubricant cylinder to a lubrication orifice in the spindle nut and opens out in the region of the threaded spindie, when the nut is in contact with the greasing piston.

This feature is also advantageous in terms of design: the reason is that no lubricant hose or the like needs to be installed from the lubricant cylinder to the lubrication point; instead the lubricant is conveyed downward by way of the greasing piston itself, and passes through the lubrication orifice in the spindle nut directly into the thread region between the spindle nut and threaded spindle. This feature as well therefore once again greatly reduces the design requirements.

It is preferred in this context if there is provided in the press ram a discharge orifice for used lubricant that opens below the spindle nut into a space between the spindle nut, threaded spindle, and press ram, and connects that space to a reservoir for used lubricant.

This feature is also advantageous in terms of design: the reason is that there is located in the space, so to speak, a comoving lubricant reservoir that ensures sufficient lubrication in the thread region as the spindle nut travels along the threaded spindle, and on the other hand collects the used lubricant. When fresh lubricant is then pressed between the threaded spindle and spindle nut above this space, the used lubricant is pressed out of the space into the reservoir, where it can be removed and disposed of in environmentally compatible fashion.

This feature also makes a substantial contribution to increasing the operating reliability of the new press, since used grease does not accumulate at inaccessible locations in the press, where it can result in operating malfunctions due to corresponding hardening.

It is further preferred if the discharge orifice opens into a pocket that is provided on the press ram on the latter's outer side that is guided in a tubular element, an orifice being provided in the tubular element and connecting the pocket to the reservoir, the pocket preferably having, in the axial direction of the threaded spindle, an extension that corresponds approximately to the maximum stroke of the greasing piston in the lubricant cylinder.

The advantage here is that provision is made, with a simple design, for used lubricant to be disposed of via the pocket into the reservoir in all the axial positions of the press ram in which a lubricating operation takes place. When the lubricant cylinder is filled, i.e. when the greasing piston is in its axially lower position, the orifice in the tubular element is arranged in the upper region of the pocket; the pocket then migrates farther upward, with reference to the orifice, from one lubricating operation to the next, until the orifice ultimately is located at the lower end of the pocket.

The size of the lubricant cylinder can moreover be selected, without complex design actions, in such a way that when operated 16 hours a day, the lubricant cylinder does not need to be refilled with lubricant for approximately three years. The inventors of the present application have recognized that because of the concentric arrangement of the lubricant cylinder above the spindle nut but inside the tubular element guiding the press plunger, so much room is available that this quantity of lubricant can be accommodated in a kind of reservoir. It is thus not absolutely necessary, however, to provide externally accessible lubricating points for filling the lubricant cylinder; this reservoir can instead be refilled during a maintenance operation, required in any event within three years, for which purpose the press must be dismantled. Further design advantages also result, however, from the aforementioned fact that an external refilling capability can be dispensed with. On the other hand, this reservoir can of course also be refillable via a lubrication nipple, through which both the initial lubricant quantity and also, later on, further lubricant can be conveyed.

In general, it is preferred if the reservoir comprises a cassette that is arranged on a housing element of the new device in such a way that it can be removed from the outside, preferably without tools.

The advantage here is that provision is made for disposal of the used lubricant with the simplest possible design.

Lastly, it is also preferred if an O-ring is provided between the lubricant conduit and the lubrication orifice in the spindle nut.

The advantage here is that during the lubricating operation, the lubricant in fact passes into the lubricating orifice and from there into the thread region between the threaded spindle and spindle nut, and is not pushed out to the side.

It is understood that the features mentioned above and those yet to be explained below can be used not only in the respective combinations indicated, but also in other combinations or in isolation, without leaving the context of the present invention.

BRIEF DESCRIPTION OF THE DRAWING

An embodiment of the invention is shown in the attached drawings and will be explained in more detail in the description below.

The single FIGURE shows the press according to the present invention in a partial and schematic longitudinal section.

DETAILED DESCRIPTION OF A PREFERRED EMBODIMENT

In the FIGURE, 10 designates in general fashion, as an example of a device according to the present invention, an electric press that is shown therein in schematic and partial fashion in longitudinal section. Electric press 10 comprises a press ram 11 that is guided in a tubular element 12 of the housing (not shown further) of the electric press. This press ram 11 performs a working stroke, indicated at 13, in which it shapes parts or fits them together.

Press ram 11 is actuated via a drive apparatus that comprises an electric motor indicated at 14 and a spindle drive 15. Electric motor 14 drives a threaded spindle 16, which is mounted in axially immovable fashion but is rotatable, on which sits a spindle nut 17 that is longitudinally displaceably but radially nonrotatable. By rotation of threaded spindle 16 about its rotation axis 18, spindle nut 17 is displaced along rotation axis 18, causing press ram 11, threaded onto the spindle nut at 19, to execute stroke 13.

A dosing system indicated at 20, comprising a lubricant cylinder 21 for the reception of lubricant, is provided for lubrication in particular of the thread region between threaded spindle 16 and spindle nut 17. Lubricant cylinder 21 comprises a tubular cylinder element 22, centeredly surrounding threaded spindle 16, adjoining which at the top is a flange 23. Cylinder element 22, flange 23, and tubular element 12 thus delimit an interior space 24 in which the lubricant is located.

A greasing piston 25, which is prevented from falling out by a stop 26, projects into this interior space 24. Greasing piston 25 is also arranged concentrically with threaded spindle 16 and is guided internally on tubular element 12.

Remotely from lubricant cylinder 21, greasing piston 25 has a stepped orifice 27 into which spindle nut 17 projects in such a way that a wall 28 of greasing piston 25 lies between spindle nut 17 and tubular element 12.

This wall 28 of greasing piston 25 is penetrated by a lubricant conduit 31, running parallel to rotation axis 18, that proceeds out from interior space 24 and ends in the region of an O-ring 32 at the point where greasing piston 25 is in contact with press ram 11 when electric press 10 is in the position shown in the FIGURE.

Provided in press plunger 11 is an angled lubricating orifice 33 that connects lubricant conduit 31 to a lubrication orifice 34 that passes radially through spindle nut 17 in the region of threaded join 19 and opens out in the region of the threads between threaded spindle 16 and spindle nut 17.

Of course it is also possible to configure greasing piston 25 without angled orifice 27 and wall 28, so that lubricant conduit 31 then ends directly at the end face of spindle nut 18, facing toward greasing piston 25, in which an angled lubrication orifice is then provided. In other words, it is not necessary for lubricant conduit 31 to be connected, via lubrication orifice 33 in press ram 11, to lubrication orifice 34 in spindle nut 17. It is thus possible to dispense with lubrication orifice 33 or to provide it directly in spindle nut 17. It is necessary for this purpose, however, to provide for greater manipulations on spindle nut 17, which is generally undesirable and is eliminated by the aforesaid configuration of greasing piston 25 and by lubrication orifice 33 in press plunger 11. In addition, greasing piston 25 is thus securely guided on spindle nut 17 and cannot tilt.

Provided below spindle nut 17 and between the latter, press ram 11, and threaded spindle 16, is a space 36 that opens toward threaded spindle 16. This space 36 is connected via a discharge orifice 37 to a pocket 38 that is provided on press ram 11 on its outer side 39, by which it is guided in tubular element 12.

Pocket 38 is in turn connected, by way of an orifice 41 provided in tubular element 12, to a reservoir 42 for used lubricant. This reservoir 42 is configured as a removable cassette 43 that is set in place from outside into a corresponding recess 44 in tubular element 12, and can be replaced without tools.

When electric press 10 as described so far is in operation, spindle nut 17 is located at a distance from greasing piston 25, so that greasing piston 25 is not moved during a working stroke 13. If a lubricating operation is now to be initiated, spindle nut 17 is then moved, by a corresponding rotation of threaded spindle 16, into the position shown in the FIGURE, where either spindle nut 17 or press ram 11 is in contact with greasing piston 25.

By way of a further stroke of spindle nut 17, upward (in the FIGURE) toward electric motor 14, greasing piston 25 is now moved farther into interior space 24, causing lubricant to pass through lubricant conduit 31 and lubrication orifices 33, 34 into the thread region between threaded spindle 16 and spindle nut 17. This lubricant displaces lubricant that has collected in space 36, and pushes it through discharge orifice 37 into pocket 38. When further lubricant is added, pocket 38 is emptied via orifice 41 into reservoir 42, which can be cleaned by removing cassette 43.

Space 36 now contains fresh lubricant, so that as operation of electric press 10 continues, continuous lubrication between threaded spindle 16 and spindle nut 17 is ensured by, so to speak, a co-moving lubricant reservoir. The used lubricant once again collects in space 36 and is replaced, in the manner described, by new lubricant after a predefined number of working strokes.

At each lubricating operation, greasing piston 25 moves somewhat farther into interior space 24, so that at each lubricating operation, pocket 38 is located somewhat higher up. In the position shown in the Figure, the pocket is still located with its upper end 45 in the region of orifice 41, since it was assumed in this case that interior space 24 is completely filled with lubricant. During the service life of electric press 10, pocket 38 now continues to migrate farther up as lubricating operations occur, until ultimately it is located with its lower end 46 in the region of orifice 41. Pocket 38 has an extension in the direction of rotation axis 18 that corresponds to the maximum stroke of greasing piston 25 in lubricant cylinder 21.

During a working stroke 13 of electric press 10, pocket 38 is moreover sealed by way of the inner wall of tubular element 12, so that used lubricant located there cannot escape in any other way. Since the lubricant is generally grease, lubricant present in reservoir 42 also cannot easily pass back through orifice 41 into the interior of electric press 10.

Also shown to the left next to electric motor 14 is a lubrication nipple 47 through which interior space 24 of dosing system 20 can be filled with lubricant. Once electric press 10 has been completely assembled, lubricant is pressed through this lubrication nipple 47 into interior space 24 until it has propagated through lubricant conduit 31, lubricant orifices 33, 34, and discharge orifice 37 into pocket 38, and from there through orifice 41 into reservoir 42. In other words, lubricant is introduced at lubrication nipple 47 until it emerges again from orifice 41.

In the same manner, it is also possible to replace all of the lubricant after electric press 10 has been in operation for a long time. This is done by introducing fresh lubricant once again through lubrication nipple 47 until all the used lubricant has collected in reservoir 42.

Not only electric press 10 but also dosing system 20 are controlled via a control system indicated at 48, which comprises, inter alia, a position and force measurement system indicated at 49. By way of control system 48 and position and force measurement system 49, spindle nut 17 and thus press ram 11 can be moved in defined fashion, their precise axial position being reported to control system 48 at all times via position and force measurement system 49.

Control system 48 now makes it possible for the actuation of dosing system 20 also to be accomplished on the basis of concrete operating states of electric press 10. For this purpose, control system 48 senses the loads—i.e. number of working strokes, respective stroke length, stroke speed, and force exerted—then integrates these operating states and initiates a lubrication action based on specifications of the manufacturer of the spindle drive. Dosing system 20 can thereby be actuated precisely and on the basis of need.

For this purpose, control system 48 stores the axial position of spindle nut 17 at the end of a dosing operation, and then returns to precisely that position when a new lubrication action is necessary. In addition, the quantity of lubricant delivered can be exactly metered by way of electric motor 14.

In conclusion, be it also noted that dosing system 20 does not require a separate actuation apparatus, but rather the lubricating operation is also effected by way of control system 48, which already activates electric motor 14 to perform the working stroke. All that must additionally be provided, compared with an electric press 10 without a dosing system 20, are lubricant cylinder 21 and greasing piston 25; in addition, lubrication orifices 33 and 34 must be installed, and space 36 must be provided for, for example by way of an appropriate washer when press ram 11 and spindle nut 17 are threaded together. Discharge orifice 37, pocket 38, orifice 41, and reservoir 42 can be dispensed with if it is acceptable for used lubricant to be distributed and to collect in undefined fashion in electric press 10.

Therefore, what we claim, is:

1. A device having a part actuated via a drive apparatus, wherein a dosing system to be actuated by the drive apparatus is provided for lubricating at least the drive apparatus;

the drive apparatus comprises a spindle drive and an electric motor for actuating the spindle drive;

the spindle drive comprises a threaded spindle, driven by the electric motor and mounted in axially nondisplaceable fashion, and a spindle nut that is axially displaceable via the threaded spindle but is radially nonrotatable, and is joined to the actuated part; the dosing system comprising a lubricant cylinder to be filled with lubricant and a greasing piston for ejecting the lubricant and projecting into said cylinder's interior, the greasing piston being actuated via the drive apparatus.

2. The device as in claim 1, wherein the part is a handling device having an actuated positioning part.

3. The device as in claim 1, wherein the part is a press having a press ram actuated by the drive apparatus.

4. The device as in claim 1, wherein the greasing piston is in working engagement with the spindle drive as a function of the axial position of the actuated part.

5. The device as in claim 1, wherein the greasing piston comes into contact with the spindle nut when the actuated part is in an axial position outside its working stroke.

6. The device as in claim 1, wherein the lubricant cylinder is provided preferably concentrically with the threaded spindle, preferably on the side of the spindle nut remote from the press plunger, and the greasing piston is arranged preferably concentrically with the threaded spindle between the lubricant cylinder and the spindle nut.

7. The device as in claim 6, wherein there is provided in the greasing piston a lubricant conduit that connects the interior space of the lubricant cylinder to a lubrication orifice in the spindle nut and opens out in the region of the threaded spindle, when the spindle nut is directly or indirectly in contact with the greasing piston.

8. The device as in claim 7, wherein there is provided in the press ram a discharge orifice for used lubricant that opens below the spindle nut into a space between the spindle nut, threaded spindle, and press ram, and connects that space to a reservoir for used lubricant.

9. The device as in claim 8, wherein the discharge orifice opens into a pocket that is provided on the press ram on its outer side that is guided in a tubular element, an orifice being provided in the tubular element and connecting the pocket to the reservoir.

10. The device as in claim 9, wherein the pocket has, in the axial direction of the threaded spindle, an extension that corresponds approximately to the maximum stroke of the greasing piston in the lubricant cylinder.

11. The device as in claim 8, wherein the reservoir is a replaceable cassette that is mounted on the device in externally accessible fashion.

12. The device as in claim 7, wherein an O-ring is provided between the lubricant conduit and the lubrication orifice, ensuring a seal between the lubricant conduit and the lubrication orifice during lubrication.

* * * * *